(12) United States Patent
Cluff et al.

(10) Patent No.: US 7,805,231 B2
(45) Date of Patent: Sep. 28, 2010

(54) INTEGRATED VEHICLE CRASH SENSING SYSTEM AND METHOD

(75) Inventors: Charles A. Cluff, Zionsville, IN (US); Robert K Constable, Kokomo, IN (US); Brian M. Stavroff, Galveston, IN (US); Robert R. McConnell, Lafayette, IN (US)

(73) Assignee: Delphi Technologies, Inc., Troy, MI (US)

( * ) Notice: Subject to any disclaimer, the term of this patent is extended or adjusted under 35 U.S.C. 154(b) by 729 days.

(21) Appl. No.: 11/478,347

(22) Filed: Jun. 29, 2006

(65) Prior Publication Data

US 2008/0046147 A1 Feb. 21, 2008

(51) Int. Cl.
*B60R 22/00* (2006.01)
*E05F 15/00* (2006.01)
*G05D 3/00* (2006.01)

(52) U.S. Cl. .............. 701/45; 701/36; 701/38; 701/46; 701/70; 340/440; 340/429; 340/438; 73/504.02; 73/504.03; 180/282; 280/734; 280/735

(58) Field of Classification Search .......... 701/45, 701/36, 46, 70, 38; 340/440, 429, 438; 73/504.02, 73/504.03; 180/282; 280/734, 735
See application file for complete search history.

(56) References Cited

U.S. PATENT DOCUMENTS

| | | | | | |
|---|---|---|---|---|---|
| 5,610,575 | A | * | 3/1997 | Gioutsos | 340/429 |
| 5,825,284 | A | * | 10/1998 | Dunwoody et al. | 340/440 |
| 5,835,873 | A | * | 11/1998 | Darby et al. | 701/45 |
| 5,890,084 | A | * | 3/1999 | Halasz et al. | 701/45 |
| 6,002,974 | A | * | 12/1999 | Schiffmann | 701/36 |
| 6,002,975 | A | * | 12/1999 | Schiffmann et al. | 701/36 |
| 6,038,495 | A | * | 3/2000 | Schiffmann | 701/1 |
| 6,182,783 | B1 | * | 2/2001 | Bayley | 180/282 |
| 6,212,455 | B1 | * | 4/2001 | Weaver | 701/45 |

(Continued)

FOREIGN PATENT DOCUMENTS

EP  1219500  7/2002

(Continued)

OTHER PUBLICATIONS

EP Search Report dated Oct. 26, 2007.

*Primary Examiner*—Khoi Tran
*Assistant Examiner*—Jorge O Peche
(74) *Attorney, Agent, or Firm*—Thomas N. Twomey

(57) ABSTRACT

A vehicle crash sensing system and method are provided for sensing a vehicle crash event. The system includes a linear acceleration sensor located on a vehicle for sensing linear acceleration along a first sensing axis and generating a linear acceleration signal. The system has linear crash sensing logic for determining a crash event along the first sensing axis as a function of the sensed linear acceleration. The system also has signal processing circuitry for processing the linear acceleration signal and generating a processed linear acceleration signal. The system has an angular rate sensor located on the vehicle for sensing an angular roll rate of the vehicle about a second sensing axis and generating a roll rate signal. The system further includes rollover crash sensing logic for determining a rollover event of the vehicle about the second sensing axis as a function of the processed linear acceleration signal and the roll rate signal.

3 Claims, 3 Drawing Sheets

U.S. PATENT DOCUMENTS

| | | | |
|---|---|---|---|
| 6,301,536 B1* | 10/2001 | Vaessen et al. | 701/45 |
| 6,535,800 B2* | 3/2003 | Wallner | 701/1 |
| 6,542,792 B2* | 4/2003 | Schubert et al. | 701/1 |
| 6,584,388 B2* | 6/2003 | Schubert et al. | 701/46 |
| 6,600,985 B2* | 7/2003 | Weaver et al. | 701/45 |
| 6,631,317 B2* | 10/2003 | Lu et al. | 701/45 |
| 6,714,848 B2* | 3/2004 | Schubert et al. | 701/46 |
| 6,827,172 B2* | 12/2004 | Ide et al. | 180/282 |
| 6,925,413 B2* | 8/2005 | Krieg et al. | 702/152 |
| 7,017,700 B2* | 3/2006 | Frimberger et al. | 180/282 |
| 7,107,136 B2* | 9/2006 | Barta et al. | 701/70 |
| 7,213,670 B2* | 5/2007 | Iyoda et al. | 180/282 |
| 7,222,010 B2* | 5/2007 | Suzuki et al. | 701/70 |
| 7,228,217 B2* | 6/2007 | Iyoda et al. | 701/70 |
| 7,333,883 B2* | 2/2008 | Geborek et al. | 701/45 |
| 7,422,087 B2* | 9/2008 | Geborek | 180/282 |
| 7,440,844 B2* | 10/2008 | Barta et al. | 701/124 |
| 7,502,675 B2* | 3/2009 | Hac et al. | 701/38 |
| 7,516,038 B2* | 4/2009 | Lehtonen et al. | 702/141 |
| 7,698,036 B2* | 4/2010 | Watson et al. | 701/45 |
| 7,702,441 B2* | 4/2010 | Geborek et al. | 701/45 |
| 2002/0019719 A1* | 2/2002 | Kueblbeck et al. | 702/147 |
| 2002/0087235 A1* | 7/2002 | Aga et al. | 701/1 |
| 2002/0099486 A1* | 7/2002 | Nagao et al. | 701/45 |
| 2003/0088349 A1* | 5/2003 | Schubert et al. | 701/36 |
| 2003/0120408 A1* | 6/2003 | Caruso et al. | 701/45 |
| 2003/0158633 A1* | 8/2003 | Schubert | 701/1 |
| 2004/0199317 A1* | 10/2004 | Ogata et al. | 701/45 |
| 2005/0080544 A1* | 4/2005 | Suzuki et al. | 701/70 |
| 2005/0113983 A1* | 5/2005 | Schubert | 701/1 |
| 2005/0154512 A1* | 7/2005 | Schubert et al. | 701/38 |
| 2005/0171672 A1* | 8/2005 | Wallner | 701/70 |
| 2005/0257981 A1* | 11/2005 | Iyoda et al. | 180/282 |
| 2006/0184301 A1* | 8/2006 | Konno et al. | 701/45 |
| 2006/0253239 A1* | 11/2006 | Williams | 701/45 |

FOREIGN PATENT DOCUMENTS

| | | |
|---|---|---|
| EP | 1270337 | 1/2003 |
| EP | 1312515 | 5/2003 |
| EP | 1502823 | 2/2005 |
| GB | 2335521 | 9/1999 |

* cited by examiner

INTEGRATED VEHICLE CRASH SENSING SYSTEM AND METHOD

TECHNICAL FIELD

The present invention generally relates to vehicle crash sensing, and more particularly relates to an integrated sensing system capable of sensing multiple crash events of the vehicle.

BACKGROUND OF THE INVENTION

Automotive vehicles are generally equipped with various restraint devices that deploy in the event that a vehicle is involved in a crash, such as a forward collision, a rear collision, a side (lateral) collision or a rollover. For example, air bags, side curtains, seatbelt pretensioners, pop-up roll bars and other devices can be deployed when certain crash events are detected. These and other restraint devices require timely deployment to mitigate adverse effects to occupants in the vehicle. To achieve timely deployment of restraint devices, the vehicle dynamics generally must be monitored and a decision must be made to determine whether some type of vehicle crash is anticipated to occur or is occurring.

Various vehicle crash sensing systems employ sensors to sense dynamic conditions of the vehicle. For example, a conventional crash sensing system may employ inertial sensors for sensing linear acceleration and/or angular velocity. Some conventional crash sensing systems are designed to detect only a frontal crash event. Other crash sensing systems have been designed to detect other vehicle crash events such as a side impact crash, a rear impact crash and vehicle rollover events.

Each type of crash event detection generally employs inertial sensing requirements that are unique to that type of crash event. These requirements generally place constraints on the range, resolution and placement within the vehicle of each type of inertial sensor. Consequently, increasing the types of crash events that can be detected for a vehicle necessarily increases the number of sensors that are generally required to detect those crash events, and thereby results in an increase in the cost of the overall crash detection systems. For example, a conventional vehicle side impact crash detection system may employ a single linear accelerometer, the output of which is processed by a side crash event algorithm. A separate and distinct rollover crash sensing system may employ another separate and distinct accelerometer along with an angular rate sensor, the outputs of which are processed by a rollover crash event algorithm. The two separate crash sensing systems typically employ separate inertial acceleration sensors that are each calibrated for a specific crash event and are not integrated.

It is therefore desirable to provide for a cost-effective vehicle crash sensing system that advantageously integrates device(s), and is capable of detecting multiple crash sensing events. In particular, it is desirable to provide for a vehicle crash sensing system that integrates one or more inertial sensors into one crash sensing system capable of detecting multiple crash events.

SUMMARY OF THE INVENTION

In accordance with the teachings of the present invention, a vehicle crash sensing system and method are provided for sensing an impact crash event and/or a rollover crash event of a vehicle. According to one aspect of the present invention, the vehicle crash sensing system includes a linear acceleration sensor located on a vehicle for sensing linear acceleration along a first sensing axis and generating a linear acceleration signal. The system has crash sensing logic for determining a crash event along the first sensing axis as a function of the sensed linear acceleration. The system also has signal processing circuitry for processing the linear acceleration signal and generating a processed linear acceleration signal. The system has an angular rate sensor located on the vehicle for sensing an angular roll rate of the vehicle about a second sensing axis and generating a roll rate signal. The system further includes rollover crash sensing logic for determining a rollover event of the vehicle about the second sensing axis as a function of the processed linear acceleration signal and the roll rate signal.

According to another aspect of the present invention, a method of detecting a crash event of a vehicle due to at least one of an impact crash event and a rollover event is provided. The method includes the step of sensing linear acceleration along a first sensing axis of the vehicle with a first linear acceleration sensor and generating a sensed linear acceleration signal. The method also includes the step of sensing a crash event along the first sensing axis as a function of the sensed linear acceleration signal. The method includes the step of processing the linear acceleration signal with signal processing circuitry to generate a processed linear acceleration signal. The method also includes the step of sensing an angular roll rate of the vehicle about a second sensing axis and generating a roll rate signal. The method further includes the step of determining a rollover event of the vehicle about the second sensing axis as a function of the processed linear acceleration signal and the roll rate signal.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
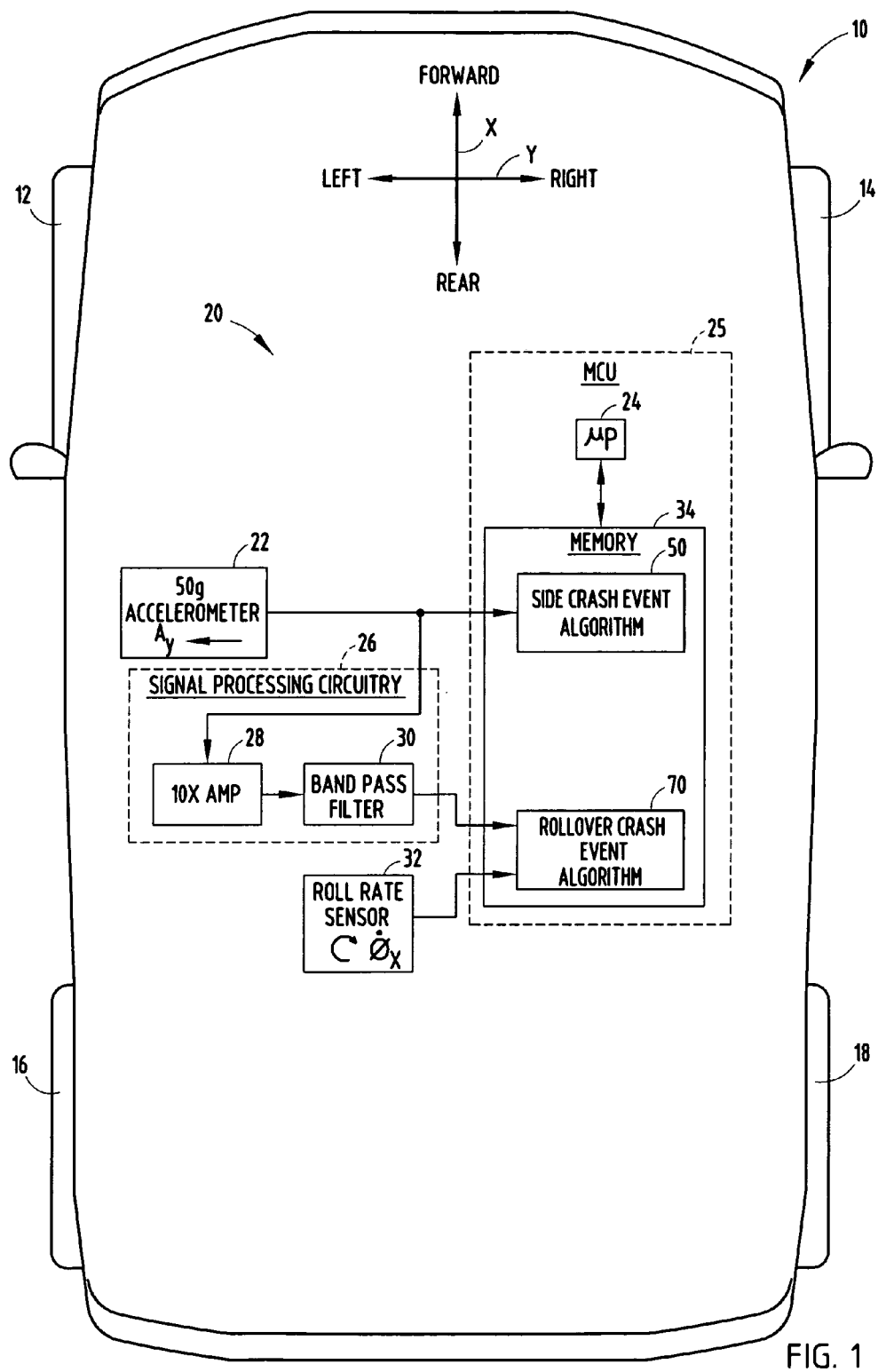
FIG. 1 is a block diagram of a vehicle equipped with a vehicle crash sensing system for detecting side impact crash and vehicle rollover crash events according to one embodiment of the present invention.

Referring to FIG. 1, a vehicle 10 is generally illustrated equipped with a vehicle crash sensing system 20 for detecting either or both of an impact crash event and a rollover event of the vehicle 10. The vehicle 10 shown is a wheeled automotive vehicle generally shown having four wheels 12, 14, 16 and 18 for travelling on the ground, such as a roadway. The vehicle crash sensing system 20 may be contained in a module on the automotive vehicle 10 or may have components at various locations onboard the vehicle 10. The crash sensing system 20 has inertial sensors arranged to detect a side crash event along the lateral Y-axis of the vehicle 10 and a rollover crash event about the longitudinal X-axis of the vehicle 10, according to the embodiments shown. However, the vehicle crash sensing system 20 may be configured with sensors arranged to detect linear crash events and rollover events about any desired axes.

A vehicle rollover event, as explained herein in connection with the present invention, may include side-to-side rotation of the vehicle 10 about the longitudinal axis, shown as the X-axis, of the vehicle 10, commonly referred to as "vehicle rollover," or back-to-front rotation of the vehicle 10 about the vehicle lateral axis, shown as the Y-axis, commonly referred to as a "vehicle pitchover," or a combination of rollover and pitchover. For purposes of describing the rollover event sensing of the present invention, the term "rollover" is generally used to refer to either a rollover event or a pitchover event. Additionally, an impact crash event may include a side impact crash event of the vehicle 10 along the lateral Y-axis, a frontal or rear impact crash event along the X-axis, or other impact crash events occurring along other sensing axes.

The vehicle crash sensing system 20 is designed to be located on the vehicle 10 to sense vehicle dynamics, particularly linear acceleration in a direction along a first sensing axis, and an angular rate (velocity) of the vehicle 10 about a second sensing axis. In the embodiments shown and described herein, the first sensing axis (e.g., Y-axis) is orthogonal to the second sensing axis (e.g., X-axis). However, linear acceleration and angular rate may be sensed in other first and second sensing axes according to other embodiments.

Included in the vehicle crash sensing system 20, according to the first embodiment, is a linear accelerometer 22, shown oriented on the vehicle 10 to sense linear acceleration $A_Y$ along the lateral Y-axis. One example of a suitable linear accelerometer is Model No. ADXL78 commercially available from Analog Devices, Inc., rated at 50 g. Also included in vehicle crash sensing system 20 is an angular roll rate sensor 32 arranged, according to the first embodiment, on the vehicle 10 to sense angular roll rate about the longitudinal X-axis of the vehicle 10. One example of a suitable angular rate sensor is Model No. EWTZGC250, commercially available from Panasonic. The linear accelerometer 22 and angular roll rate sensor 32 may be located at any of a number of locations on the vehicle 10 to sense linear acceleration along the lateral Y-axis and angular rate about the longitudinal X-axis, respectively. According to some examples, the linear accelerometer 22 may be mounted in the vehicle passenger compartment, in a vehicle door or on a structural support of the vehicle 10, such as the A-pillar, B-pillar or C-pillar. The angular roll rate sensor 32 may be mounted in the vehicle passenger compartment near the center, according to one example, or elsewhere onboard the vehicle 10.

The liner accelerometer 22 and angular roll rate sensor 32 are integrated into a single vehicle crash sensing system 20 to sense either or both of a side impact crash event and a rollover event according to the embodiment shown and described herein. The vehicle crash sensing system 20 employs the linear accelerometer 22 to generate a linear acceleration $A_Y$ that is employed both by a side crash event algorithm 50 and a rollover crash event algorithm 70. The vehicle crash sensing system 20 therefore employs the linear accelerometer 20 in a manner that allows for sensing multiple crash events, thereby eliminating the need for separate and distinct acceleration sensors.

The vehicle crash sensing system 20 has a controller, shown as a microprocessor control unit (MCU) 25, having a microprocessor 24 and memory 34. Stored within memory 34 are the side crash event algorithm 50 and rollover crash event algorithm 70. The microprocessor 24 may include any known analog and/or digital processing circuitry capable of executing the side crash event algorithm 50 and rollover crash event algorithm 70. Memory 34 may include conventional memory storage medium such as electrically erasable programmable read-only memory (EEPROM) or random access memory (RAM) that may store various program calibrations and routines for performing the crash sensing detection. The MCU 25 may be a dedicated crash sensing controller or may be implemented on a shared controller.

Figure 3:
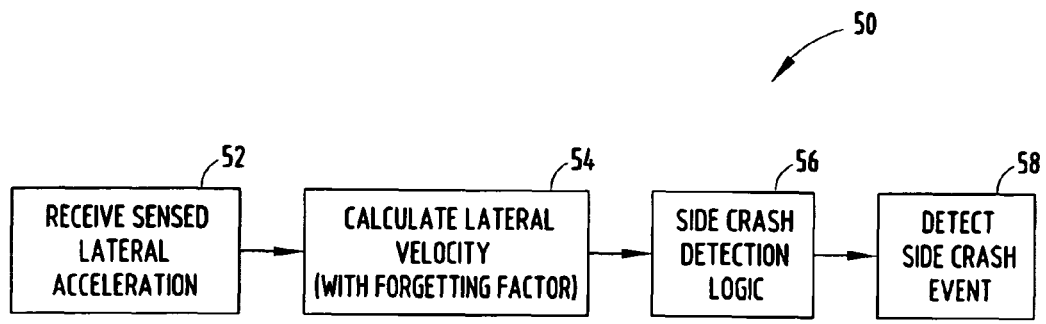
FIG. 3 is a flow diagram illustrating a side crash event algorithm according to one embodiment.

The vehicle crash sensing system 20 senses a linear impact crash event, such as a side crash event, by processing the linear acceleration signal $A_Y$ output from the linear accelerometer 22. For a side impact event, the linear accelerometer 22 is oriented along the lateral Y-axis of the vehicle 10. The output of the linear accelerometer 22 is shown input to the side crash event algorithm 50. Any of a number of side crash event algorithms 50 may be employed to sense the presence of a side impact crash event. One example of a side crash event algorithm 50 is shown in FIG. 3.

The crash sensing system 20 employs signal conditioning circuitry 26 for processing the sensed acceleration signal $A_Y$ output from the linear accelerometer 22 and outputs a processed linear acceleration signal to the rollover crash event algorithm 70. The signal conditioning circuitry 26 enables the use of a single accelerometer 22 that is generally configured for use to detect a side impact crash event to also be employed to detect a vehicle rollover crash event, according to one embodiment of the present invention. The signal conditioning circuitry 26 processes the linear acceleration signal output to alter the range, resolution and/or bandwidth of the inertial linear acceleration sensor 22 used for the side impact crash event in order to provide linear acceleration data that meets the requirements for sensing a second crash-type event, namely a vehicle rollover event. The signal conditioning circuitry 26 therefore allows for elimination of duplicative sensors by generating the appropriately processed linear acceleration signal.

The signal conditioning circuitry 26 is shown including an amplifier 28 coupled to the output of linear accelerometer 22, and a band-pass filter 26 coupled to the output of the amplifier 28. The amplifier 28 amplifies the sensed linear acceleration signal $A_Y$ by an amplification gain, such as 10× according to one example. The band-pass filter 30 has a pass band, such as a frequency range of 0.1 Hz to 50 Hz, according to one embodiment. According to another embodiment, the band-pass filter 30 may have the low frequency portion of the signal removed by the subtraction of the output of a linear integration function tracking the low band portion of the signal. The band-pass filter 30 therefore filters low frequencies below 0.1 Hz and high frequencies above 50 Hz, according to this embodiment, to reduce or eliminate noise. The amplified and filtered linear acceleration signal is then input to the rollover crash event algorithm 70.

The digital signal conditioning circuitry 26 may be implemented in analog circuitry, according to one embodiment. According to another embodiment, the signal conditioning circuitry 26 may be implemented in digital circuitry. According to other embodiments, a combination of analog and digital circuitry may be employed in the signal conditioning circuitry 26 to process the sensed linear acceleration signal $A_Y$ and make the processed linear acceleration signal available as an input to the rollover crash event algorithm 70.

The vehicle crash sensing system 20 further includes an angular roll rate sensor 32 for sensing angular rate (velocity) $\dot{\phi}_X$ of the vehicle 10 about a second sensing axis. In the embodiment shown, the angular roll rate sensor 32 is oriented to sense angular rate about the longitudinal X-axis of the vehicle 10, and generates a sensed angular rate signal $\dot{\phi}_X$ indicative thereof. Any of a number of angular rate sensors 32 may be employed to sense the vehicle angular roll rate $\dot{\phi}_X$. Angular roll rate sensor 32 may be oriented about another sensing axis, such as the lateral Y-axis to determine a pitch rate of the vehicle 10.

Figure 4:
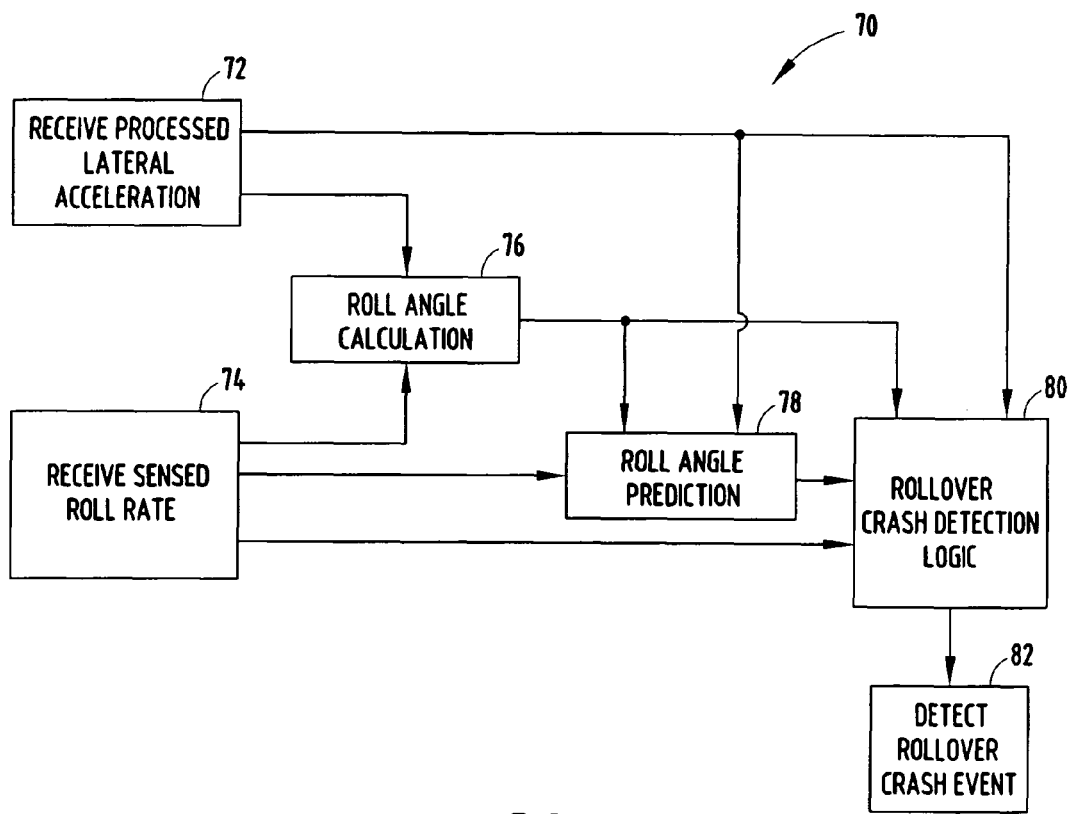
FIG. 4 is a flow diagram illustrating a rollover crash event algorithm according to one embodiment.

The rollover crash event algorithm 34 therefore receives as inputs the processed linear acceleration signal and the sensed angular roll rate signal. The rollover crash event algorithm 70 processes the linear acceleration and angular rate signals and determines an anticipated or actual rollover of the vehicle 10 about the longitudinal X-axis. According to other embodiments, the rollover crash event algorithm 70 may determine a rollover event of the vehicle 10 about other axes, such as the lateral Y-axis, also referred to as a pitchover event. Any of a number of rollover crash event algorithms may be employed. One example of a rollover crash event algorithm 70 is shown in FIG. 4.

Figure 2:
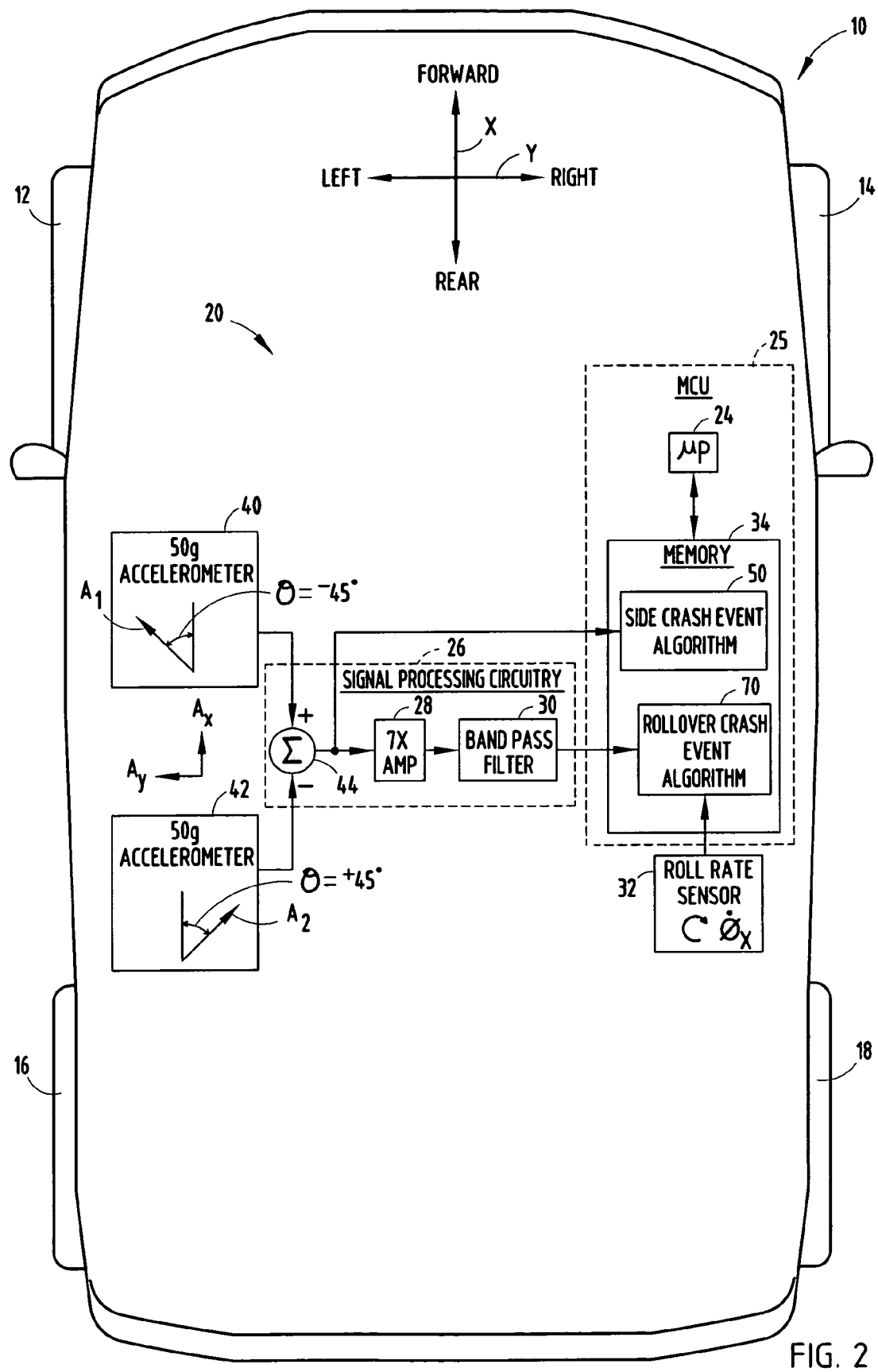
FIG. 2 is a block diagram of a vehicle equipped with a vehicle crash sensing system for detecting side impact crash and vehicle rollover crash events according to a second embodiment of the present invention.

Referring to FIG. 2, a vehicle 10 is illustrated employing a vehicle crash sensing system 20 according to a second embodiment of the present invention. The vehicle crash sensing system 20 according to the second invention employs first and second linear acceleration sensors (accelerometers) 40 and 42, each oriented at an angle offset from each other and in a direction offset from both the longitudinal X-axis and lateral Y-axis of the vehicle 10. The first linear accelerometer 40 is oriented in a first axis at an angle θ offset by −45° from the longitudinal X-axis of the vehicle 10 as shown. Linear accelerometer 40 generates a first linear acceleration signal $A_1$ at angle θ=−45°. The second linear accelerometer 42 is oriented in a second axis at an angle θ offset by +45° from the longitudinal X-axis of the vehicle 10. The second linear accelerometer 42 generates a second linear acceleration signal $A_2$ at angle θ=+45°. Thus, in the embodiment shown, first and second linear accelerometers 40 and 42 are arranged orthogonal (90°) relative to each other and are offset from both the longitudinal X-axis and lateral Y-axis of the vehicle 10 such that each of accelerometers 40 and 42 senses components of linear acceleration $A_X$ and $A_Y$ in each of the respective longitudinal X-axis and lateral Y-axis of the vehicle 10.

It should be appreciated that the first and second linear accelerometers 40 and 42 in the system 20 according to the second embodiment advantageously sense linear accelerations $A_1$ and $A_2$ about the two separate axes. By orienting the first and second linear accelerometers 40 and 42 at angles θ=−45° and θ=+45°, respectively, such that the corresponding sensing axes are offset from both the longitudinal X-axis and lateral Y-axis of the vehicle 10, each of the linear accelerometer sensors 40 and 42 provide a longitudinal X-axis acceleration component $A_X$ and a lateral Y-axis acceleration component $A_Y$. According to one example, the accelerometers 40 and 42 may include an integrated dual axis accelerometer, such as Model No. ADXL278, commercially available from Analog Devices, Inc.

The vehicle crash sensing system 20 according to the second embodiment employs signal processing circuitry 26 that includes an arithmetic logic device 44, such as a summer or a subtractor for either summing or subtracting the sensed linear acceleration signals $A_1$ and $A_2$ output from the first and second linear accelerometers 40 and 42. According to the embodiment shown, the sensed linear acceleration signals from each of the first and second linear accelerometers 40 and 42 are subtracted such that the difference provides a signal indicative of the lateral acceleration in the Y-axis. The arithmetically summed output of the sensed acceleration signals $A_1$ and $A_2$ provides the lateral Y-axis linear acceleration component that is input to a side crash event algorithm 50 for processing as discussed above.

The signal processing circuitry 26 in the vehicle crash sensing system 10 according to the second embodiment further employs an amplifier 28 for amplifying arithmetic summed linear acceleration signal, and a band-pass filter 30 for filtering amplified linear acceleration signals. The amplified and filtered linear acceleration signal is then input to a rollover crash event algorithm 70. Additionally, an angular roll rate signal $\dot{\phi}_X$ sensed by angular roll rate sensor 32 oriented to sense angular acceleration about the longitudinal X-axis is also input to the rollover crash events algorithm 70 and is processed as discussed above in connection with the first embodiment.

The vehicle crash sensing system 20 according to the second embodiment is shown employing two linear accelerometers 40 and 42 each rated as 50 g acceleration sensors that produce the equivalent of a single axis 5 g acceleration sensor, according to one example. The amplification gain provided by the amplifier 28 is of a different magnitude (e.g., 7x) from that of the first embodiment, due to the magnitude of the summing vector acceleration components $A_X$ and $A_Y$ from the two contributing linear accelerometers 40 and 42. The band-pass filter 30 may have a pass band frequency range from 0.1 Hz to 50 Hz, according to one embodiment.

It should be appreciated that the two linear accelerometers 40 and 42 also provide the linear acceleration $A_X$ along the longitudinal X-axis, which may be processed by the MCU 25 for additional crash event detection or other purposes. The vehicle crash sensing system 20 may employ additional sensors that may be processed by the same or different crash algorithms that detect any of a number of crash events of the vehicle 10.

Referring to FIG. 3, one example of a side crash event algorithm 50 is illustrated. The side crash event algorithm 50 begins at step 52 receiving the sensed lateral acceleration signal and proceeds to calculate a lateral velocity in step 54. The lateral velocity calculation may include performing an integration with a forgetting factor. Algorithm 50 then proceeds to apply the lateral acceleration and lateral velocity signals to a side crash detection logic in step 56. The side crash detection logic 56 may include any known logic for establishing thresholds indicative of a lateral impact crash event with the vehicle 10. The algorithm 50 then detects a side crash event in step 58. The algorithm 50 may be repeatedly executed.

Referring to FIG. 4, one example of a rollover crash event algorithm 70 is illustrated. The rollover crash event algorithm 70 begins by receiving the processed lateral acceleration signal in step 72 and receiving the sensed roll rate signal in step 74. A roll angle calculation step 76 calculates a roll angle based on the sensed roll rate and lateral acceleration. This may include integrating the roll rate signal. Next, a roll angle prediction step 78 predicts a roll angle based on the processed lateral acceleration signal, the roll angle calculation, and the sensed roll rate. In step 80, a rollover crash detection logic detects a rollover event based on the processed lateral acceleration signal, roll angle calculation, roll angle prediction, and sensed roll rate. The detection logic 80 may include any known rollover crash event detection logic for detecting a vehicle rollover event. Algorithm 70 then detects a rollover crash event as indicated in step 82. Algorithm 70 may be repeatedly executed to continuously detect a rollover event.

It should be appreciated that the side crash event algorithm 50 and rollover crash event algorithm 70 may be processed by the same or different MCU 25 or other analog and/or digital circuitry by executing software code as should be evident to those skilled in the art. The MCU 25 may be part of a dedicated controller or may be a shared controller within the vehicle 10. Additionally, one or more outputs of the MCU 25 generally provides output signal(s) that may be made available to various restraint devices and other devices that may utilize a crash event indicative signal.

The vehicle crash sensing system 20 according to the present invention advantageously integrates the use of a linear accelerometer signal in a crash sensing system 20 to enable sensing of multiple crash events. In particular, a linear accelerometer is employed to sense a crash event and a rollover event of a vehicle by employing signal processing circuitry so as to eliminate the need for separate and distinct acceleration sensors, thereby eliminating duplication and reducing the cost of the overall crash sensing system 20.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An integrated vehicle crash sensing system for a vehicle having a longitudinal axis and lateral axis perpendicular to the longitudinal axis and adapted for detecting a side impact crash event and a rollover crash event, said integrated vehicle crash sensing system comprising:

a first linear acceleration sensor located on the vehicle for sensing linear acceleration along a first axis oriented +45 degrees angle relative to the longitudinal axis, coplanar with a horizontal plane defined by the longitudinal axis and the lateral axis, and generating a first sensed linear acceleration signal;

a second linear acceleration sensor located on the vehicle for sensing linear acceleration along a second axis oriented −45 degrees angle relative to the longitudinal axis, coplanar with a horizontal plane defined by the longitudinal axis and the lateral axis, and generating a second sensed linear acceleration signal;

a signal processing circuitry configured to receive the first sensed linear acceleration signal and the second sensed linear acceleration signal, said signal processing circuitry comprising an arithmetic logic device configured to subtract the first sensed linear acceleration signal from the second sensed linear acceleration signal and thereby generate a lateral acceleration signal suitable for detecting a side impact crash event;

a side crash sensing logic for receiving the lateral acceleration signal and adapted for determining a side impact crash event along the lateral axis as a function of the lateral acceleration signal;

said signal processing circuitry further comprising an amplifier for amplifying the lateral acceleration signal to generate an amplified lateral acceleration signal, and a filter for filtering the amplified lateral acceleration signal to thereby generate a processed linear acceleration signal suitable for detecting a rollover crash event;

an angular rate sensor located on the vehicle for sensing an angular roll rate of the vehicle about the longitudinal axis and generating an angular roll rate signal suitable for detecting a rollover crash event; and a rollover crash sensing logic configured to receive the processed linear acceleration signal and the angular roll rate signal for determining a rollover event of the vehicle about the longitudinal axis as a function of the processed linear acceleration signal and the angular roll rate signal.

2. The crash sensing system as defined in claim 1, wherein the filter comprises a band-pass filter.

3. The crash sensing system as defined in claim 2, wherein the band-pass filter has a pass band frequency ranging from about 0.1 Hz to 50 Hz.

* * * * *